(12) United States Patent
Mackin

(10) Patent No.: US 10,377,498 B2
(45) Date of Patent: Aug. 13, 2019

(54) AIRCRAFT AND ASSOCIATED METHOD FOR PROVIDING ELECTRICAL ENERGY TO AN ANTI-ICING SYSTEM

(71) Applicant: The Boeing Company, Chicago, IL (US)

(72) Inventor: Steve G. Mackin, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 266 days.

(21) Appl. No.: 15/003,064

(22) Filed: Jan. 21, 2016

(65) Prior Publication Data

US 2017/0210478 A1 Jul. 27, 2017

(51) Int. Cl.
  B64D 15/12 (2006.01)
  F01D 15/10 (2006.01)
  F02C 6/00 (2006.01)

(52) U.S. Cl.
  CPC ............ B64D 15/12 (2013.01); F01D 15/10 (2013.01); F02C 6/00 (2013.01); *B64D 2221/00* (2013.01); *F05D 2220/76* (2013.01); *Y02T 50/671* (2013.01)

(58) Field of Classification Search
  CPC ........................... B64D 15/12; B64D 2221/00
  See application file for complete search history.

(56) References Cited

U.S. PATENT DOCUMENTS

| | | | | |
|---|---|---|---|---|
| 6,965,183 B2* | 11/2005 | Dooley | ............... | H02K 1/2786 310/179 |
| 7,468,561 B2* | 12/2008 | Kern | ...................... | H02P 9/302 290/4 A |
| 7,740,201 B2* | 6/2010 | Eichholz | ................... | B64C 1/18 244/118.1 |
| 7,882,691 B2* | 2/2011 | Lemmers, Jr. | .......... | F02C 7/275 475/6 |
| 7,936,082 B2* | 5/2011 | Boudyaf | ................ | B64D 15/12 219/202 |
| 7,966,806 B2 | 6/2011 | Henry et al. | | |

(Continued)

OTHER PUBLICATIONS

Tooley, Mike and David Wyatt. "Aircraft Electrical and Electronic Systems: Principles, Operation and Maintenance." Elsevier (2009). pp. 159-163. (Year: 2009).*

*Primary Examiner* — Brian M O'Hara
*Assistant Examiner* — Michael B. Kreiner
(74) *Attorney, Agent, or Firm* — Alston & Bird LLP

(57) ABSTRACT

An aircraft, an aircraft engine and a corresponding method provide for anti-icing based upon energy provided by a fan assembly of the aircraft engine, such as by rotation of a low pressure shaft of the fan assembly. The aircraft includes an aircraft body having wings and an aircraft engine carried by the aircraft body. The aircraft engine includes a core gas turbine engine and a fan assembly coupled to the core gas turbine engine. The fan assembly may include a fan, a low pressure turbine and a low pressure shaft connecting the fan and the low pressure turbine. The aircraft engine also includes an electric anti-icing system that has a variable frequency generator driven by the fan assembly, and one or more resistive heaters carried by the wings. The variable frequency generator is configured to provide electrical energy to the one or more resistive heaters.

12 Claims, 3 Drawing Sheets

(56) References Cited

U.S. PATENT DOCUMENTS

| | | | | |
|---|---|---|---|---|
| 8,026,624 | B2* | 9/2011 | Beutin | F01D 15/10 |
| | | | | 290/52 |
| 8,519,555 | B2* | 8/2013 | Dooley | F01D 15/10 |
| | | | | 290/1 A |
| 8,777,155 | B2* | 7/2014 | Pereira | B64D 41/00 |
| | | | | 244/58 |
| 8,928,166 | B2* | 1/2015 | Seger | F01D 15/10 |
| | | | | 290/46 |
| 8,943,839 | B2* | 2/2015 | Merry | F02C 7/275 |
| | | | | 60/39.163 |
| 9,200,592 | B2* | 12/2015 | Berryann | F01D 19/00 |
| 2012/0061482 | A1* | 3/2012 | Stothers | B64D 15/20 |
| | | | | 237/2 R |
| 2014/0197681 | A1* | 7/2014 | Iwashima | B60R 16/03 |
| | | | | 307/9.1 |
| 2015/0244296 | A1* | 8/2015 | Edwards | F02C 9/00 |
| | | | | 290/40 B |
| 2016/0214723 | A1* | 7/2016 | Fox | B64D 13/06 |
| 2017/0190441 | A1* | 7/2017 | Mackin | F01D 25/36 |
| 2018/0266329 | A1* | 9/2018 | Mackin | F02C 7/36 |

* cited by examiner

AIRCRAFT AND ASSOCIATED METHOD FOR PROVIDING ELECTRICAL ENERGY TO AN ANTI-ICING SYSTEM

TECHNOLOGICAL FIELD

An example embodiment relates generally to a technique for controllably anti-icing an aircraft and, more particularly, to providing electrical energy to an anti-icing system from a variable frequency generator driven by a low pressure shaft of an aircraft engine.

BACKGROUND

The accumulation of ice on the, wings, flaps, and other control surfaces of an aircraft may be detrimental to the performance of the aircraft. As such, many aircraft include anti-icing systems for preventing or reducing the accumulation of ice during flight. For example, aircraft can include a pneumatic anti-icing system that directs heated air to the flaps and other control surfaces in order to prevent or reduce icing of those surfaces. Alternatively, aircraft may include an electrical anti-icing system that relies upon resistors embedded in the surface of the aircraft to heat the respective surfaces as current flows therethrough.

With respect to a pneumatic anti-icing system, heated air is directed to the wing leading edge or control surfaces of the aircraft. For example, the heated air serves to heat the leading edges to prevent or reduce the accumulation of ice thereupon. The heated air that is utilized by a pneumatic anti-icing system may be, for example, bleed air that is extracted from the aircraft engine. However, the heated air may have a temperature that is so high that the ductwork required to route the heated air to the flaps or other control surfaces must be made of materials that are specifically adapted to withstand such elevated temperatures, thereby increasing the cost of the ductwork. In order to reduce the temperature of the heated air and to avoid requirements for the ductwork to be made of a material specifically designed to withstand greater temperatures and to allow for safe circulation of the heated air through the fuel-filled wings, the heated air bled from the aircraft engine may be cooled, such as from a temperature of about 1000° F. upon exiting the aircraft engine to a temperature of about 450° F. or less.

As such, a pneumatic anti-icing system may include a pre-cooler, such as a radiator over which the heated air is passed, in order to reduce the temperature of the heated air prior to delivery of the heated air to the flaps or other control surfaces. The pre-cooler is at least sometimes located in the ductwork through which the heated air is directed. Although the pre-cooler is able to cool the bleed air extracted from the aircraft engine to a suitable temperature for anti-icing purposes, the elevated temperature of the bleed air may cause the size of the pre-cooler to be increased which, in turn, may cause the size of the ductwork in which the pre-cooler is disposed to correspondingly increase. Since space onboard an aircraft is limited, any increase in the size of the ductwork may be disadvantageous.

Additionally, pneumatic anti-icing systems may sometimes weigh more and be more complex than is desirable for smaller aircraft. Even with larger aircraft, a pneumatic anti-icing system may adversely impact the design requirements. In this regard, a multi-engine aircraft may be designed such that in an instance in which bleed air cannot be extracted from one of the aircraft engines, the flight can continue even if flying in icing conditions by channeling bleed air from the other aircraft engine to the flaps and/or control surfaces in order to prevent or reduce the ice accumulation upon the flaps and other control surfaces. In this scenario, the size of both of the aircraft engines may have to be increased in order to provide for continued anti-icing capabilities in the event that one of the engines is not available to provide bleed air, thereby correspondingly increasing the cost and weight of the aircraft engines.

Regarding an electric anti-icing system, the flaps and other control surfaces of an aircraft may include resistors embedded therein. By causing electrical current to flow through the resistors, heat is generated to prevent or reduce the accumulation of ice on the flaps and other control surfaces. The electrical current that flows through the resistors is generated by the rotation of the high pressure shaft of the aircraft engine, thereby adding to the load of the core gas turbine engine. As a result, the design of the aircraft engine must therefore take into account the additional load on the core gas turbine engine created by the provision of electrical current to the anti-icing system, thereby causing the size, weight and cost of the aircraft engine to be disadvantageously increased in some instances. Additionally, the provision of energy from the core gas turbine engine to the anti-icing system may also cause the pilot to increase the engine speed which may be disadvantageous during descent or while in a holding pattern.

BRIEF SUMMARY

An aircraft, an aircraft engine and a method are provided in accordance with an example embodiment in order to provide anti-icing functionality without adversely impacting the size of the aircraft engines. In this regard, electrical current may be provided to resistors carried by, such as by being embedded within, the flaps or other control surfaces with the electrical current being drawn from the fan assembly, such as from rotation of the low pressure shaft of the fan assembly, of an aircraft engine. Since the low pressure shaft has capacity to provide such electrical energy to an electric anti-icing system without having to resize the low pressure shaft and without impacting the core gas turbine engine, the size of the aircraft engine need not be increased as a result of its support of the electric anti-icing system. Thus, the aircraft can effectively provide the electrical power to support an electric anti-icing system without any increase in the size of the aircraft engine.

In an example embodiment, an aircraft is provided that includes an aircraft body having one or more wings and an aircraft engine carried by the aircraft body. The aircraft engine includes a core gas turbine engine and a fan assembly coupled to the core gas turbine engine. The fan assembly may include a fan, a low pressure turbine and a low pressure shaft connecting the fan and the low pressure turbine. The aircraft engine further includes an electric anti-icing system that includes a variable frequency generator driven by the fan assembly, and one or more resistive heaters carried by the wings. The variable frequency generator is configured to provide electrical energy to the resistive heaters.

The electric anti-icing system of an example embodiment also includes an anti-icing control system configured to control delivery of the electrical energy from the variable frequency generator to the one or more resistive heaters. In an example embodiment, the electric anti-icing system further includes a heater mat that includes the one or more resistive heaters carried by a leading edge of the wings. The variable frequency generator may be directly driven by the low pressure shaft of the fan assembly. The variable frequency generator of an example embodiment is dedicated to providing electrical energy to the electric anti-icing system.

The aircraft of an example embodiment also includes a pneumatic system to controllably provide air to a cabin of the aircraft. The pneumatic system includes a pre-cooler configured to reduce a temperature of the air delivered to the cabin. The electric anti-icing system of this example embodiment is independent of the pneumatic system. The aircraft may also include a floor heater mat and the variable frequency generator may be configured to provide electrical energy to the floor heater mat. The variable frequency generator of this example embodiment is further configured to discontinue provision of electrical energy to the floor heater mat upon detection of an icing condition.

In another example embodiment, an aircraft engine is provided that includes a core gas turbine engine and a fan assembly coupled to the core gas turbine engine. The fan assembly may include a fan, a low pressure turbine and a low pressure shaft connecting the fan and the low pressure turbine. The aircraft engine further includes an electric anti-icing system that includes a variable frequency generator driven by the fan assembly, and one or more resistive heaters carried by wings of an aircraft. The variable frequency generator is configured to provide electrical energy to the resistive heaters.

The electric anti-icing system of an example embodiment includes a drive shaft extending between the variable frequency generator and the low pressure shaft of the fan assembly and one or more gears mechanically coupling the drive shaft and the low pressure shaft such that rotation of the low pressure shaft drives the motor shaft. The variable frequency generator of an example embodiment is directly driven by the low pressure shaft of the fan assembly. The variable frequency generator may be dedicated to providing electrical energy to the electric anti-icing system. The variable frequency generator of an example embodiment is also configured to provide electrical energy to a floor heater mat in an instance in which an icing condition has not been detected.

In a further example embodiment, a method is provided that includes driving a variable frequency generator of an electric anti-icing system with a fan assembly of an aircraft engine. The method further includes providing electrical energy to one or more resistive heaters of the electric anti-icing system from the variable frequency generator. Additionally, the method resistively heats an exterior surface of the aircraft in response to provision of the electrical energy to the electric anti-icing system.

The one or more resistive heaters of an example embodiment are carried by a leading edge of a wing of an aircraft. In addition, the electric anti-icing system of the example embodiment includes an anti-icing control system. In this example embodiment, the method resistively heats the exterior surface of the aircraft by controlling delivery of the electrical energy from the variable frequency generator to the one or more resistive heaters with the anti-icing control system. The method of an example embodiment resistively heats the exterior surface of the aircraft by resistively heating the exterior surface with a heater mat that includes the one or more resistive heaters carried by a leading edge of a wing of the aircraft.

In an example embodiment, the method directly drives the variable frequency generator with the low pressure shaft of the fan assembly. The variable frequency generator may be dedicated to providing electrical energy to the electric anti-icing system. The method of an example embodiment may also include controllably providing air to a cabin of the aircraft with a pneumatic system. In this example embodiment, the pneumatic system includes a pre-cooler configured to reduce a temperature of the air delivered to the cabin, and the electric anti-icing system is independent of the pneumatic system. The method of an example embodiment also includes providing electrical energy to a floor heater mat of the aircraft with the variable frequency generator. The method may discontinue provision of electrical energy to the floor heater mat upon detection of an icing condition.

BRIEF DESCRIPTION OF THE DRAWINGS

Figure 1:
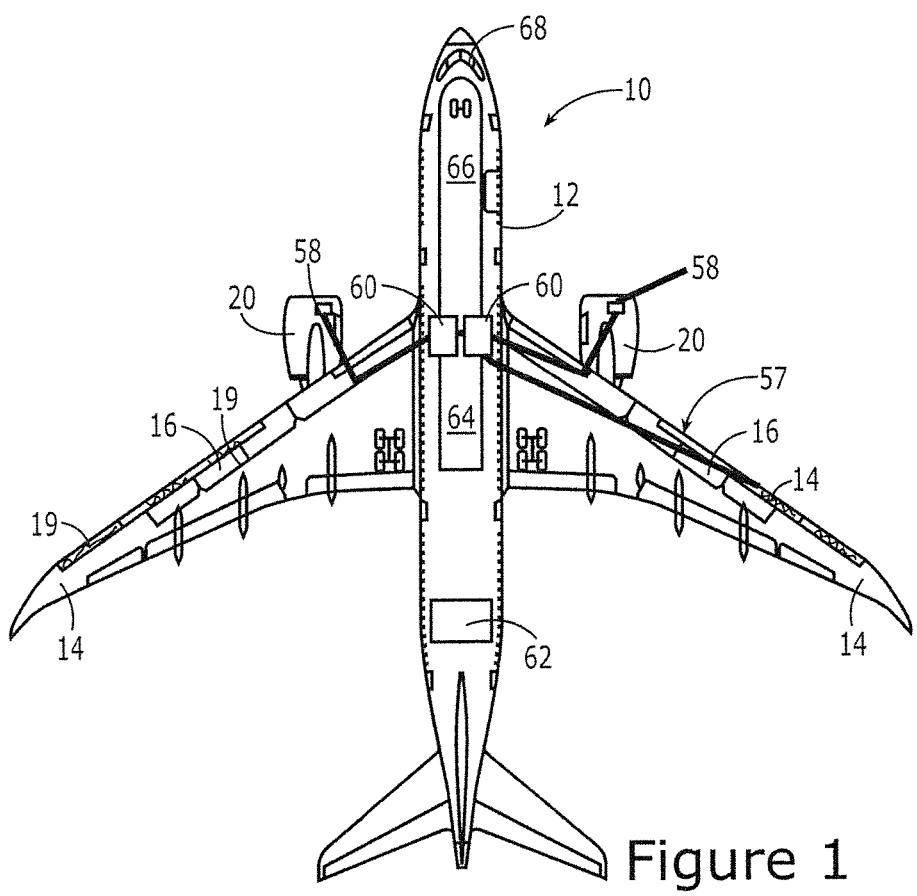
Figure 2:
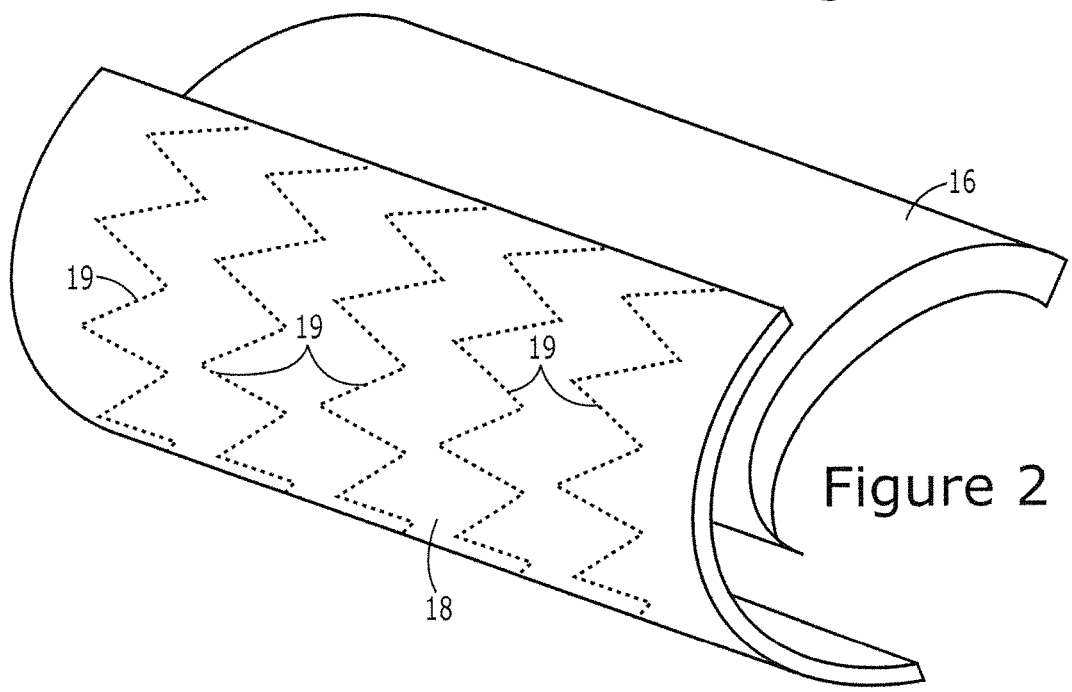
Figure 3:
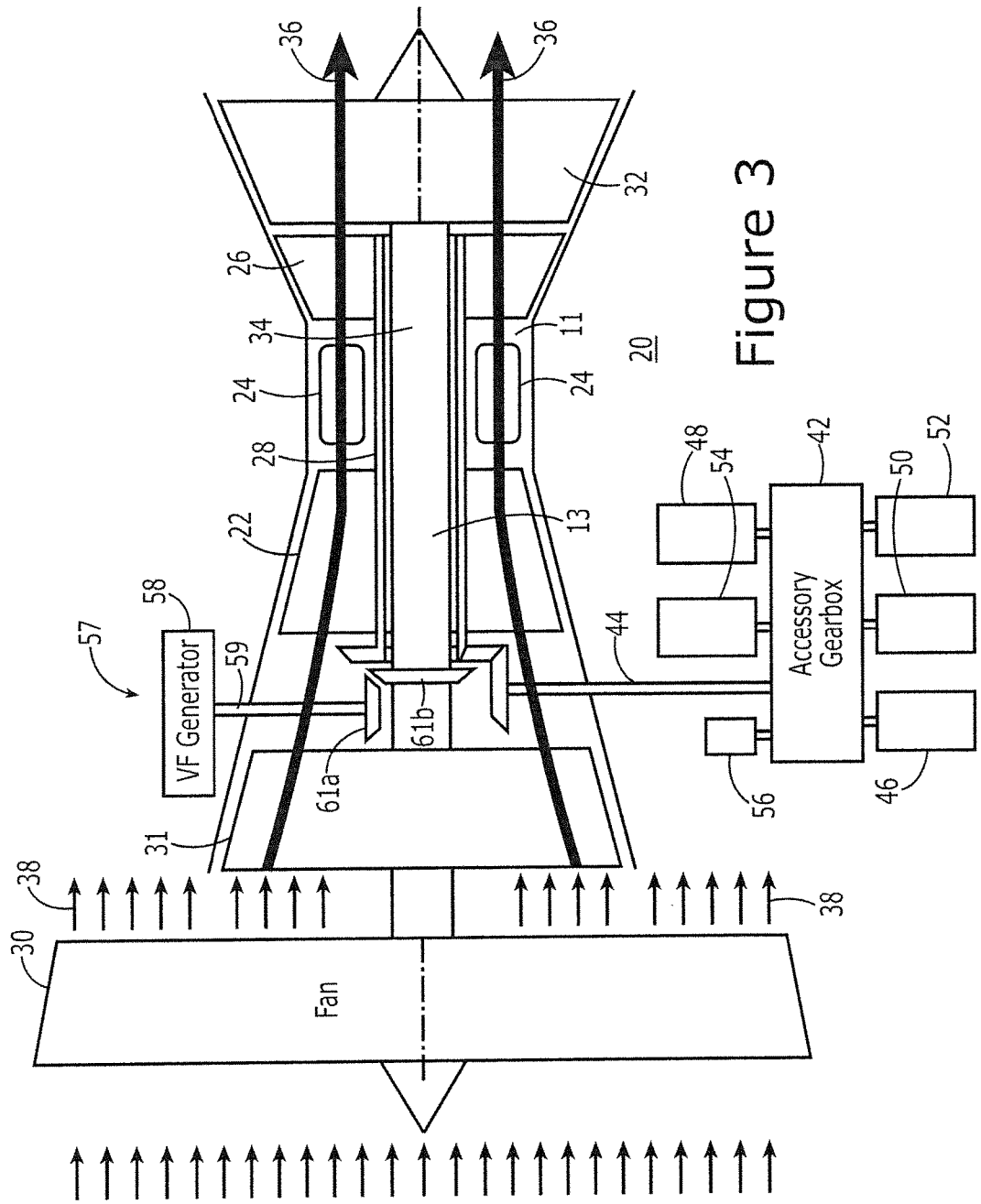
Figure 4:
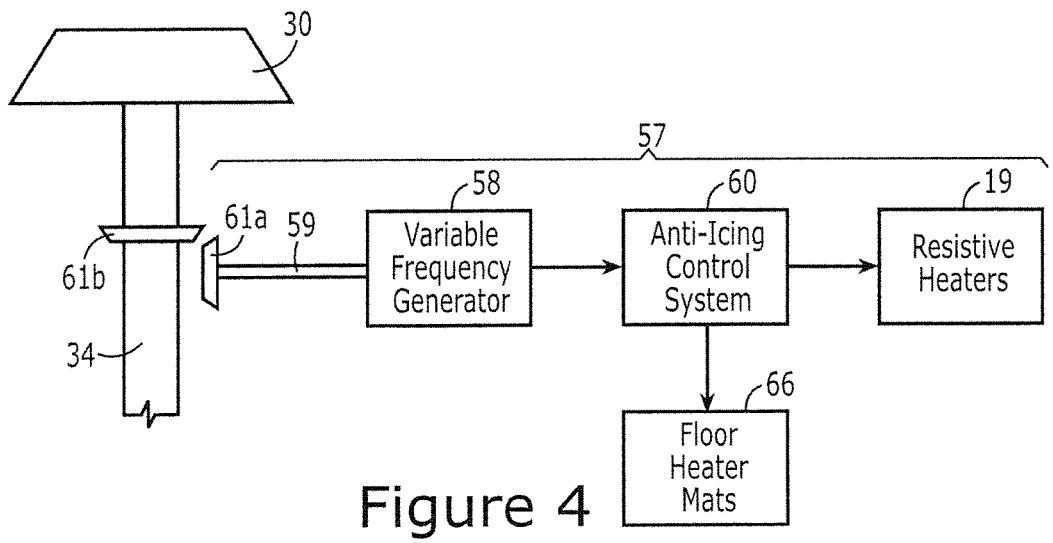
Figure 5:
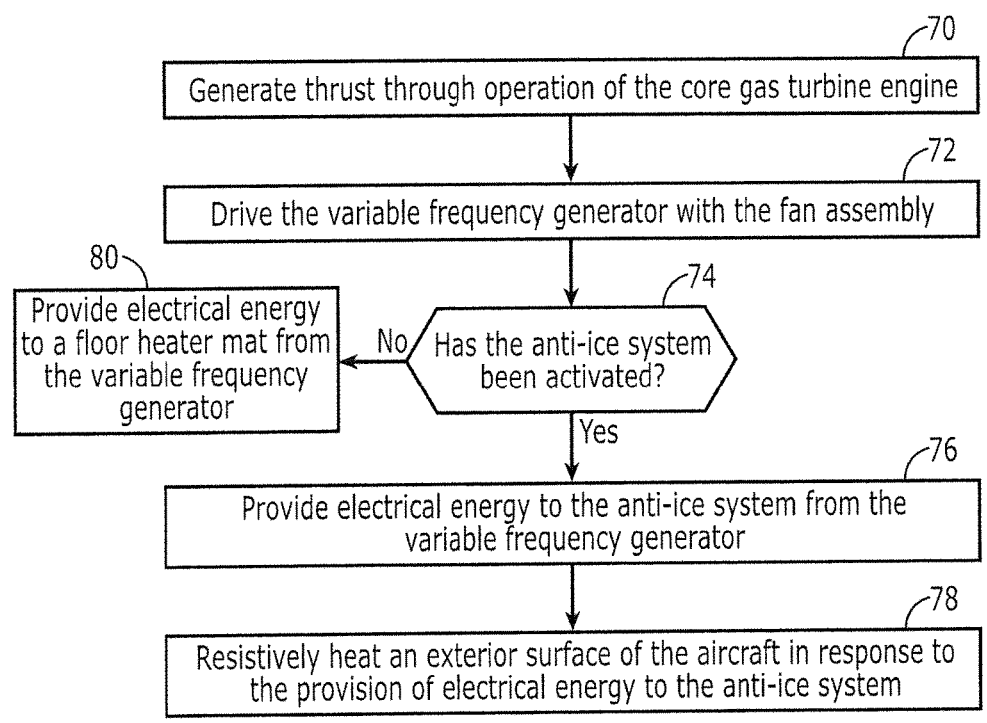

Having thus described embodiments of the present disclosure in general terms, reference will now be made to the accompanying drawings, which are not necessarily drawn to scale, and wherein:

FIG. 1 is a plan view of an aircraft configured to provide the electrical power to support an anti-icing system in accordance with an example embodiment of the present disclosure;

FIG. 2 is an exploded perspective view of an heater mat carried by a leading edge of a wing of an aircraft and configured to be powered in accordance with an example embodiment of the present disclosure;

FIG. 3 is a schematic representation of an aircraft engine in accordance with an example embodiment of the present disclosure;

FIG. 4 is a block diagram of an electric anti-icing system and related components in accordance with an example embodiment of the present disclosure; and FIG. 5 is a flowchart illustrating operations performed in accordance with an example embodiment of the present disclosure.

DETAILED DESCRIPTION

Embodiments of the present disclosure now will be described more fully hereinafter with reference to the accompanying drawings, in which some, but not all embodiments are shown. Indeed, these embodiments may be embodied in many different forms and should not be construed as limited to the embodiments set forth herein; rather, these embodiments are provided so that this disclosure will satisfy applicable legal requirements. Like numbers refer to like elements throughout.

As shown in FIG. 1, an aircraft 10 generally includes an aircraft body 12 having two or more wings 14 extending laterally outward therefrom. The aircraft 10 may include flaps 16 and other control surfaces for facilitating the controlled flight of the aircraft. At least some of the flaps 16 are disposed along the leading edge of the wings 14. In the example embodiment depicted in FIG. 1, the wings 14 may include a plurality of flaps 16 along their leading edges with each flap configured to be controllably deflected in order to facilitate the controlled flight of the aircraft 10.

In order to prevent or reduce the accumulation of ice upon the aircraft 10, such as upon the flaps 16 and other control surfaces, the aircraft may include an anti-icing system 57, that is shown in more detail in FIG. 4. As shown in FIG. 1, the anti-icing system 57 is an electrical system that includes one or more resistive heaters 19, such as electrical resistors, carried by portions of the aircraft, such as the wings 14 of the aircraft 10. Although the resistive heaters may be carried by various portions of the wings, the resistive heaters may be carried by the leading edge of the wings, such as by the flaps 16 and other control surfaces of the wings. The resistive heaters may be carried in various manners, but, in one embodiment, the resistive heaters are embedded within the surface of the wings 14 so as to be proximate to the external surface of the wings. Thus, heat generated by electrical current passing through the resistive heaters correspondingly causes the external surface of the wings 14 to be heated. While the resistive heaters may be configured in various manners, the anti-icing system 57 of an example embodiment includes a heater mat 18 as shown in the exploded view of FIG. 2. The heater mat 18 includes one or more resistive heaters 19 (schematically represented in FIG. 2) embedded in a mat. The heater mat 18 may be attached to or disposed along the leading edge of the wings 14, such as upon the exterior surfaces of the flaps 16, in order to provide anti-icing functionality.

As also shown in FIG. 1, the aircraft 10 includes one or more aircraft engines 20. Although the aircraft 10 may include a variety of different types of aircraft engines 20, an aircraft engine, such as a turbofan, of an example embodiment is depicted in FIG. 3 and includes a core gas turbine engine 11 and a fan assembly 13. The core gas turbine engine 11 may be referenced as the high pressure spool and includes a compressor 22, a combustor 24 and a high pressure turbine 26. The compressor 22 is coupled to the high pressure turbine 26 by a first shaft, that is, the high pressure shaft 28. The fan assembly 13 may be referenced as the low pressure spool and includes a fan 30 and a booster compressor 31 (a low pressure compressor) coupled to another turbine 32, namely, a low pressure turbine, via a second shaft, that is, the low pressure shaft 34. The high pressure and low pressure shafts 28, 34 are arranged in a concentric relationship with the high pressure shaft of an example embodiment being disposed concentrically about the low pressure shaft. The high pressure spool and the low pressure spool can operate a different pressures with the high pressure spool operating at a higher pressure than the low pressure spool.

In operation, fuel is injected into the combustor 24 and ignited. The resulting exhaust gases drive the high pressure turbine 26, which is coupled to the compressor 22 via the high pressure shaft 28. The compressor 22 is therefore also driven. After driving the high pressure turbine 26, the partially spent exhaust gas is directed downstream through the low pressure turbine 32. Since the low pressure turbine 32 is coupled to the fan 30 via the low pressure shaft 34, the fan is also driven. As a result, the fan assembly 13 is operationally coupled to the core gas turbine engine 11 even though the fan assembly and the core gas turbine engine, including the high pressure shaft 28 and the low pressure shaft 34, are not mechanically coupled to one another. As shown in FIG. 3, some of the air 38 generated by the fan 30 is sent through the core gas turbine engine 11 and utilized in the combustion process (depicted by arrows 36). However, the majority of the air 38 generated by the fan 30 is bypassed around the core gas turbine engine 11 and is utilized to generate thrust.

The aircraft engine 20 of the example embodiment depicted in FIG. 3 also includes an accessory gearbox 42 connected by a shaft 44 to the high pressure shaft 38. The accessory gearbox 42 may, in turn, provide power to various accessories including, for example, a fuel pump 46, a lubrication pump 48, a hydraulic pump 52, a generator 54 and/or a permanent magnet generator (PMG) 56. In various embodiments, the engine 20 further includes a starter 50, that in the illustrated embodiment is coupled to the accessory gearbox 42 and functions to start the aircraft engine.

In accordance with an example embodiment, the electrical energy that is utilized by the anti-icing system 57 to heat the flaps 16 and other control surfaces of the aircraft 10 is provided by the fan assembly 13, such as the low pressure shaft 34 and, in particular, by the rotation of the low pressure shaft of the aircraft engine 20. In this regard, the aircraft engine 20 and, more particularly, the electric anti-icing system 57 can also include a variable frequency generator 58 that is driven by rotation of the low pressure shaft 34. A variable frequency generator is preferable in the exemplary embodiment, as a variable frequency generator is smaller and lighter than fixed frequency generators and may be adapted for use with a gas turbine engine having wide speed variations of the low pressure shaft.

In this example embodiment, the electric anti-icing system 57 also includes a drive shaft 59 and one or more gears, such as a pair of bevel gears 61a and 61b that mechanically couple the drive shaft to the low pressure shaft 34. Thus, the rotation of the low pressure shaft 34 causes the motor shaft 59 to rotate which, in turn, provides energy to the variable frequency generator 58. In the illustrated embodiment, the bevel gear 61a is coupled to a distal end of the motor shaft 59, at an opposite end from the variable frequency generator 58, and the bevel gear 61b is coupled to the low pressure shaft 34. In the example embodiment, the bevel gear 61b is installed between the booster compressor 31 and the core gas turbine engine 11. However, it should be realized that the electric anti-icing system 57 may be coupled at any location on the low pressure shaft 34 such that rotation of the low pressure shaft 34 is configured to drive the variable frequency generator 58. The variable frequency generator 58 is, in turn, configured to provide electrical energy to the anti-icing system 57 in the form of electrical current flowing through the resistive heaters 19. As shown in FIG. 1, the variable frequency generator 58 of an example embodiment may be co-located with the aircraft engines 20, such as by being mounted upon the gearbox.

The variable frequency generator 58 of an example embodiment is directly driven by the low pressure shaft 34. That is, the variable frequency generator 58 of this example embodiment is provided energy only by rotation of the low pressure shaft 34. Since the low pressure shaft 34 generally has capacity to provide electrical energy for anti-icing purposes, anti-icing may be supported without drawing energy in the form of bleed air or shaft horsepower from the core gas turbine engine 11. The magnitude of core bleed air impacts the size of the engine core. High pressure shaft horsepower extraction impacts the operability of the engine core and thus can impact the size of the engine core and the amount of energy wasting overboard stability heat extraction. By driving the anti-icing system 57 with power drawn from the low pressure shaft 34 and not the core gas turbine engine 11, sufficient energy to support the anti-icing functionality may be provided without having to increase the engine speed when the anti-icing system 57 is activated or increase the size of the engine core compressor and turbine.

In other words, the magnitude of the engine bleed air extracted from the core engine influences the size of the engine core, specifically the size of the core compressor, shaft, and turbine. The magnitude of shaft horsepower extraction also influences the wasteful overboard stability bleed. In other words, the magnitude of the engine bleed air extracted from the core engine influences the size of the engine core, specifically the size of the core compressor, shaft and turbine. The magnitude of shaft horsepower extraction also influences the amount of wasteful overboard stability bleed required to keep the engine stable. However, the low pressure spool is sized to enable the aircraft to takeoff at sea level on a hot day. As a result, when an icing condition occurs during ascent and/or descent, the low pressure spool has the capacity for horsepower extraction because it is sized for takeoff conditions. More specifically, a size of the low pressure spool is sufficient such that extracting horsepower to operate the anti-icing system described herein will not have a significant influence on the compressor stability so no additional stability bleed for horsepower extraction. The variable frequency generator 58 of an example embodiment is dedicated to providing electrical energy to the anti-icing system 57. Thus, the variable frequency generator 58 of this example embodiment does not provide electrical energy to any other system onboard the aircraft 10.

As shown in FIG. 4, the electric anti-icing system 57 may include an anti-icing control system 60, such as a controller, configured to control the delivery of the electrical energy from the variable frequency generator 58 to the one or more resistive heaters 19. In an example embodiment depicted in FIG. 1, the anti-icing control system 60 is disposed in a non-pressurized portion of the aircraft body 12. The anti-icing control system 60 may be responsive to input, such as by a pilot or by an automated flight control system, that selectively actuates and deactuates the anti-icing system 57. Thus, in instances in which icing conditions are detected, the anti-icing system 57 may be actuated, while in instances in which the surroundings are not suitable for icing, the anti-icing system may be deactuated. In an instance in which the anti-icing control system 60 receives an indication that the anti-icing system 57 has been actuated, the anti-icing control system may cause the variable frequency generator 58 to provide the electrical energy that has been generated by rotation of the low pressure shaft 34 to the anti-icing system 57. In this regard, the electrical energy provided by the variable frequency generator 58 may cause electrical current to flow through the resistive heaters 19 to generate heat that warms the flaps 16 and other control surfaces in or on which the resistive heaters are disposed.

In addition to the anti-icing system 57 that operates based upon electrical energy provided by the variable frequency generator 58, the aircraft 10 can include a pneumatic system 62, not to provide anti-icing functionality, but to controllably provide conditioned air to the cabin 64 of the aircraft. The pneumatic system 62 may include a pre-cooler configured to reduce the temperature of the air delivered to the cabin 64 so as to be suitable for cabin purposes. In this example embodiment in which the aircraft 10 also includes a pneumatic system 62 for providing conditioned air to the cabin 64 of the aircraft, the anti-icing system is independent of the pneumatic system with the anti-icing system 57 receiving the electrical energy that causes the heating of the flaps 16 or other control surfaces from the variable frequency generator 58. Since the pneumatic system 62 of this example embodiment is responsible for the environmental condition of the cabin, but does not support the anti-icing system 57, the precooler may be significantly smaller than in instances in which a pneumatic system must also drive the anti-icing system. The reduction in the size of the precooler (not shown) may also permit the ductwork, the precooler inlet and discharge system and a fan air modulating valve (not shown) to be reduced in size relative to instances in which a pneumatic system must also drive the anti-icing system 57.

The aircraft 10 of an example embodiment may also optionally include a floor heater mat 66. In this regard, the floor heater mat 66 is positioned along the floor of the cockpit 68 or the cabin 64 and includes a plurality of resistive elements embedded in a mat. In this example embodiment, the variable frequency generator 58 is also configured to provide electrical energy to the floor heater mat 66 such that the floor heater mat generates heat and warms the floor as a result of electrical current passing through the various resistive elements.

However, the variable frequency generator 58 of this example embodiment is further configured to discontinue provision of electrical energy to the floor heater mat 66 upon detection of an icing condition. By way of example, in an instance in which the anti-icing control system 60 receives an indication that the anti-icing condition is present, the anti-icing control system may discontinue the provision of electrical energy to the floor heater mat 66 and may, instead, direct the electrical energy from the variable frequency generator 58 to actuate the anti-icing system 57, e.g. the resistive heaters 19. Thereafter, once the anti-icing control system 60 receives an indication that the icing condition is no longer present, the anti-icing control system may discontinue the provision of electrical energy from the variable frequency generator 58 to the resistive heaters 19 and may, instead, recommence the provision of electrical energy from the variable frequency generator to the floor heater mat 66 so as to again warm the floor of the cabin of the aircraft. In other embodiments, the anti-icing control system 60 is configured not to completely cease the provision of electrical energy to the floor heater mat 66 in an instance in which the anti-icing conditions are detected, but may, instead, reduce, but not eliminate, the amount of electrical energy provided to the floor heater mat while the resistive heaters 19 are actuated in order to have sufficient electrical energy from the variable frequency generator 58 to power the resistive heaters 19.

Referring now to FIG. 5, the operations performed in accordance with an example embodiment of the present disclosure are depicted. As shown in block 70 of FIG. 5, thrust is generated during flight of the aircraft 10 by operation of the core gas turbine engine 11, as described above. In order to generate electrical energy for other systems onboard the aircraft 10, such as the anti-icing system 57, the variable frequency generator 58 may be driven by the fan assembly 13, such as by the low pressure shaft 34 of the aircraft engine 20, such as concurrent with the operation of the core gas turbine engine 11. See block 72. In this regard, the variable frequency generator 58 may be directly driven by the low pressure shaft 32, such as without any direct mechanical contribution from the high pressure shaft 38. As shown in decision block 74 of FIG. 5, a determination is made, such as by the anti-icing control system 60, as to whether an icing condition has been detected. In an instance in which an icing condition has been detected, the anti-icing control system 60 directs that electrical energy is provided to the resistive heaters 19 of the aircraft 10 from the variable frequency generator 58. See block 76. The electrical energy provided to the anti-icing system 57 from the variable frequency generator 58 causes electrical current to flow through the resistive heaters 19 such that the exterior surface of at least a portion of the aircraft 10, such as one or more flaps 16 or other control surfaces of the aircraft or another portion of the leading edge of the wings 14, is resistively heated, thereby preventing or reducing ice accumulation upon the respective portion of the aircraft. See block 78.

In an embodiment in which the anti-icing system 57 includes one or more resistive heaters 19 carried by a leading edge of the wing 14 of the aircraft 10, such as one or more flaps 16 or other control surfaces of the aircraft, the exterior surface of the aircraft may be resistively heated by controlling, such as with the anti-icing control system 60, the delivery of the electrical energy from the variable frequency generator 58 to the one or more resistive heaters of the anti-icing system 57. As such, electrical current will flow through the one or more resistive heaters 19 and create heat, thereby warming the portion of the exterior surface of the aircraft proximate the resistive heaters.

Although the variable frequency generator 58 of an example embodiment is dedicated to providing electrical energy to the anti-icing system 57, the variable frequency generator of an alternative embodiment also provides electrical energy to one or more other systems onboard the aircraft 10. In this regard, the aircraft 10 may include a floor heater mat 66 and the variable frequency generator 58 may also be configured to provide electrical energy to the floor heater mat in order to heat the floor of the cabin 64 or cockpit 68. See block 80 of FIG. 5. In an example embodiment, the provision of electrical energy to the floor heater mat 66 from the variable frequency generator 58 may be contingent upon the detection of an icing condition. Thus, in an instance in which an icing condition is detected, the anti-icing control system 60 may direct that the provision of electrical energy to the floor heater mat 66 from the variable frequency generator 58 be reduced or discontinued. In this situation, electrical energy may be provided to the floor heater mat 66 from another source or the provision of electrical energy to the floor heater mat may simply be reduced or discontinued while the resistive heaters 19 are actuated. In this embodiment, however, in an instance in which a determination is made, such as by the anti-icing control system 60, that an icing condition has not been detected, that is, in an instance in which the anti-icing system is deactuated, electrical energy may be directed, such as by the anti-icing control system 60, from the variable frequency generator 58, not to the resistive heaters 19, but to the floor heater mat 66 in order to controllably heat the floor of the cabin 64 or cockpit 68.

Many modifications and other embodiments set forth herein will come to mind to one skilled in the art to which these embodiments pertain having the benefit of the teachings presented in the foregoing descriptions and the associated drawings. Therefore, it is to be understood that the embodiments are not to be limited to the specific ones disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

That which is claimed:

1. An aircraft comprising:
an aircraft body comprising one or more wings;
an aircraft engine carried by the aircraft body, wherein the aircraft engine includes:
a core gas turbine engine; and
a fan assembly comprising a low pressure shaft and coupled to the core gas turbine engine; and
an electric anti-icing system comprising a variable frequency generator driven directly by rotation of the low pressure shaft, one or more resistive heaters carried by the wings, and one or more floor heater mats, wherein the variable frequency generator provides electrical energy to the one or more floor heater mats and not to the one or more resistive heaters carried by the wings in response to no detection of an icing condition, wherein the variable frequency generator is dedicated to providing electrical energy to the one or more resistive heaters carried by the wings and ceasing to provide electrical energy to the one or more floor heater mats in response to detection of an icing condition.

2. An aircraft according to claim 1 wherein the electric anti-icing system further comprises an anti-icing control system configured to control delivery of the electrical energy from the variable frequency generator to the one or more resistive heaters.

3. An aircraft according to claim 1 wherein the electric anti-icing system further comprises a heater mat that includes the one or more resistive heaters carried by a leading edge of the wings.

4. An aircraft according to claim 1 wherein the fan assembly further includes a fan and a low pressure turbine with the low pressure shaft connecting the fan and the low pressure turbine.

5. An aircraft according to claim 1 further comprising a pneumatic system to controllably provide air to a cabin of the aircraft, wherein the pneumatic system comprises a pre-cooler configured to reduce a temperature of the air delivered to the cabin, and wherein the electric anti-icing system is independent of the pneumatic system.

6. An aircraft engine comprising:
a core gas turbine engine;
a fan assembly comprising a low pressure shaft and coupled to the core gas turbine engine; and
an electric anti-icing system comprising a variable frequency generator driven directly by rotation of the low pressure shaft, one or more resistive heaters carried by wings of an aircraft, and one or more floor heater mats, wherein the variable frequency generator provides electrical energy to the one or more floor heater mats and not to the one or more resistive heaters carried by the wings in response to no detection of an icing condition, wherein the variable frequency generator is dedicated to providing electrical energy to the one or more resistive heaters carried by the wings and ceasing to provide electrical energy to the one or more floor heater mats in response to detection of an icing condition.

7. An aircraft engine according to claim 6 wherein the fan assembly includes a fan and a low pressure turbine with the low pressure shaft connecting the fan and the low pressure turbine, and wherein the electric anti-icing system further comprises a drive shaft extending between the variable frequency generator and the low pressure shaft and one or more gears mechanically coupling the drive shaft and the low pressure shaft such that rotation of the low pressure shaft drives a motor shaft.

8. An aircraft engine according to claim 7 wherein the variable frequency generator is directly driven by the low pressure shaft.

9. A method comprising:
directly driving a variable frequency generator of an electric anti-icing system with rotation of a low pressure shaft of a fan assembly of an aircraft engine;
providing electrical energy to one or more resistors of the electric anti-icing system from the variable frequency generator, wherein the variable frequency generator is dedicated to providing electrical energy to electric anti-icing system in an instance in which an icing condition is detected;

resistively heating an exterior surface of an aircraft in response to provision of the electrical energy to the electric anti-icing system; and providing electrical energy to one or more floor heater mats and ceasing to provide electrical energy to the one or more resistors of the electric anti-icing system in response to not detecting an icing condition.

10. A method according to claim 9 wherein the one or more resistive heaters are carried by a leading edge of a wing of the aircraft, wherein the electric anti-icing system further comprises an anti-icing control system, and wherein resistively heating the exterior surface of the aircraft comprises controlling delivery of the electrical energy from the variable frequency generator to the one or more resistive heaters with the anti-icing control system.

11. A method according to claim 9 wherein resistively heating the exterior surface of the aircraft comprises resistively heating the exterior surface with a heater mat that includes the one or more resistive heaters carried by a leading edge of a wing of an aircraft.

12. A method according to claim 9 wherein the fan assembly includes a fan and a low pressure turbine with the low pressure shaft connecting the fan and the low pressure turbine.

\* \* \* \* \*